(12) United States Patent
Polefko

(10) Patent No.: US 9,974,108 B2
(45) Date of Patent: May 15, 2018

(54) PAIRED COMMUNICATION BETWEEN AN IMPLANTED MEDICAL DEVICE AND AN EXTERNAL CONTROL DEVICE

(75) Inventor: Richard J. Polefko, Parma, OH (US)

(73) Assignee: Nuvectra Corporation, Plano, TX (US)

( * ) Notice: Subject to any disclaimer, the term of this patent is extended or adjusted under 35 U.S.C. 154(b) by 0 days. days.

(21) Appl. No.: 13/366,705

(22) Filed: Feb. 6, 2012

(65) Prior Publication Data

US 2013/0205032 A1     Aug. 8, 2013

(51) Int. Cl.
G06F 15/16      (2006.01)
H04W 76/02    (2009.01)
H04L 29/06     (2006.01)

(52) U.S. Cl.
CPC ....... *H04W 76/027* (2013.01); *H04L 63/0876* (2013.01)

(58) Field of Classification Search
CPC ............................... G06F 15/16; H04W 76/02
USPC ...................................... 607/59, 60; 709/227
See application file for complete search history.

(56) References Cited

U.S. PATENT DOCUMENTS

| | | |
|---|---|---|
| 6,754,538 B2 | 6/2004 | Linberg |
| 7,058,453 B2 | 6/2006 | Nelson et al. |
| 7,155,290 B2 | 12/2006 | Von Arx et al. |
| 7,475,245 B1 | 1/2009 | Healy et al. |
| 7,528,094 B2 | 5/2009 | Blaha et al. |
| 7,885,712 B2 | 2/2011 | Goetz et al. |
| 2003/0171788 A1* | 9/2003 | Fox et al. ....................... 607/59 |
| 2006/0020304 A1 | 1/2006 | Torgerson et al. |
| 2006/0038701 A1* | 2/2006 | Goetz et al. ............. 340/870.07 |
| 2008/0058900 A1 | 3/2008 | Berthesdorf et al. |
| 2008/0071183 A1* | 3/2008 | Thomas ............... A61B 5/0472 600/516 |
| 2008/0140160 A1 | 6/2008 | Goetz et al. |
| 2009/0299438 A1 | 12/2009 | Nolan et al. |
| 2010/0100203 A1 | 4/2010 | Crivelli et al. |
| 2011/0171905 A1 | 7/2011 | Roberts et al. |
| 2012/0300948 A1* | 11/2012 | Li ........................... H04R 3/00 381/55 |

FOREIGN PATENT DOCUMENTS

WO        2005105201       11/2005

* cited by examiner

*Primary Examiner* — Normin Abedin
*Assistant Examiner* — Sibte Bukhari
(74) *Attorney, Agent, or Firm* — Haynes and Boone, LLP; Eric Q. Li

(57) ABSTRACT

A method of identifying an external device that sent a message and then determining whether to process the message based in part on the identity of the external device that sent the message. The implanted device receives a message from the external device and identifies an external device ID in the received message. The external device ID identifies the external device that sent the message. The implanted device then compares the external device ID from the message to a stored list of approved external device IDs. The implanted device processes the message when the external device ID matches one or the approved external device IDs in the stored list of approved external device IDs. However, the message is disregarded when the external device ID does not match any of the approved external device IDs in the stored list of approved external device IDs.

20 Claims, 6 Drawing Sheets

PAIRED COMMUNICATION BETWEEN AN IMPLANTED MEDICAL DEVICE AND AN EXTERNAL CONTROL DEVICE

BACKGROUND

The present invention relates to communication with implantable medical devices. Medical devices, such as cardiac pacemakers and implantable pulse generators of spinal cord stimulation systems are implanted beneath the skin of a human body. Occasionally, these implanted devices receive messages from or send data to an external device. Such messages can include, for example, receiving updated control parameters or sending operational history data that can then be analyzed by the external system.

SUMMARY

When several implantable medical devices utilize the same wireless communication protocol to communicate with external devices, it is possible that an implanted medical device will send messages to or receive messages from the wrong external device. For example, if two or more patients with the same implant are in the same location at a hospital or support group meeting, a command sent by one patient through an external controller for his implanted medical device might be received and processed by another patient's implanted medical device.

In one embodiment, the invention provides a method of identifying an external device that sent a message and then determining whether to process the message based in part on the identity of the external device that sent the message. The implanted device receives a message from the external device and identifies an external device ID in the received message. The external device ID identifies the external device that sent the message. The implanted device then compares the external device ID from the message to a stored list of approved external device IDs. The implanted device processes the message when the external device ID matches one of the approved external device IDs in the stored list of approved external device IDs. However, the message is disregarded when the external device ID does not match any of the approved external device IDs in the stored list of approved external device IDs. In some embodiments, the implanted device returns an error message to the external device when the external device ID does not match any of the approved external device IDs in the stored list.

In some embodiments, the implanted medical device processes all messages received from a clinical control device and only processes messages sent from external devices other than clinical control devices when the external device ID matches one of the approved external device IDs in the stored list of approved external device IDs. The implanted medical device determines whether the external device that sent the message is a clinical control device by comparing the external device ID to a range of external device IDs reserved for clinical control devices. A clinical control device can send instructions to the implanted medical device adding or removing external device IDs to the stored list of approved external device IDs.

In another embodiment, the invention provides an implantable medical device including a processor and a memory. The memory stores instructions that, when executed by the processor, cause the implantable medical device to identify an external device that sent a message and then determine whether to process the message based in part on the identity of the external device that sent the message.

The implantable medical device is configured to receive a message from an external device and identify an external device ID in the received message. The external device ID identifies the external device that sent the message. The implantable medical device is also configured to then compare the external device ID from the message to a stored list of approved external device IDs and to process the message when the external device ID matches one of the approved external device IDs in the stored list of approved external device IDs. The message is disregarded when the external device ID does not match any of the approved external device IDs in the stored list of approved external device IDs.

In another embodiment, the invention provides a method of communicating between an implanted medical device implanted in a patient and an external device external to the patient. The external device initiates communication with one or more implanted medical devices within range of the external device. The external device then sends a message to at least one of the implanted devices. The message includes an external device ID of the external device. The external device then receives a response message indicating whether the external device ID matches an external device ID from a list of approved external device IDs stored on a memory of the implanted medical device. When the response message indicates that the external device ID matches an approved external device ID, the external device stores an implanted device ID corresponding to the implanted device to a memory or the external device and sends subsequent command messages to control the operation of the implanted medical device corresponding to the stored implanted device ID.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
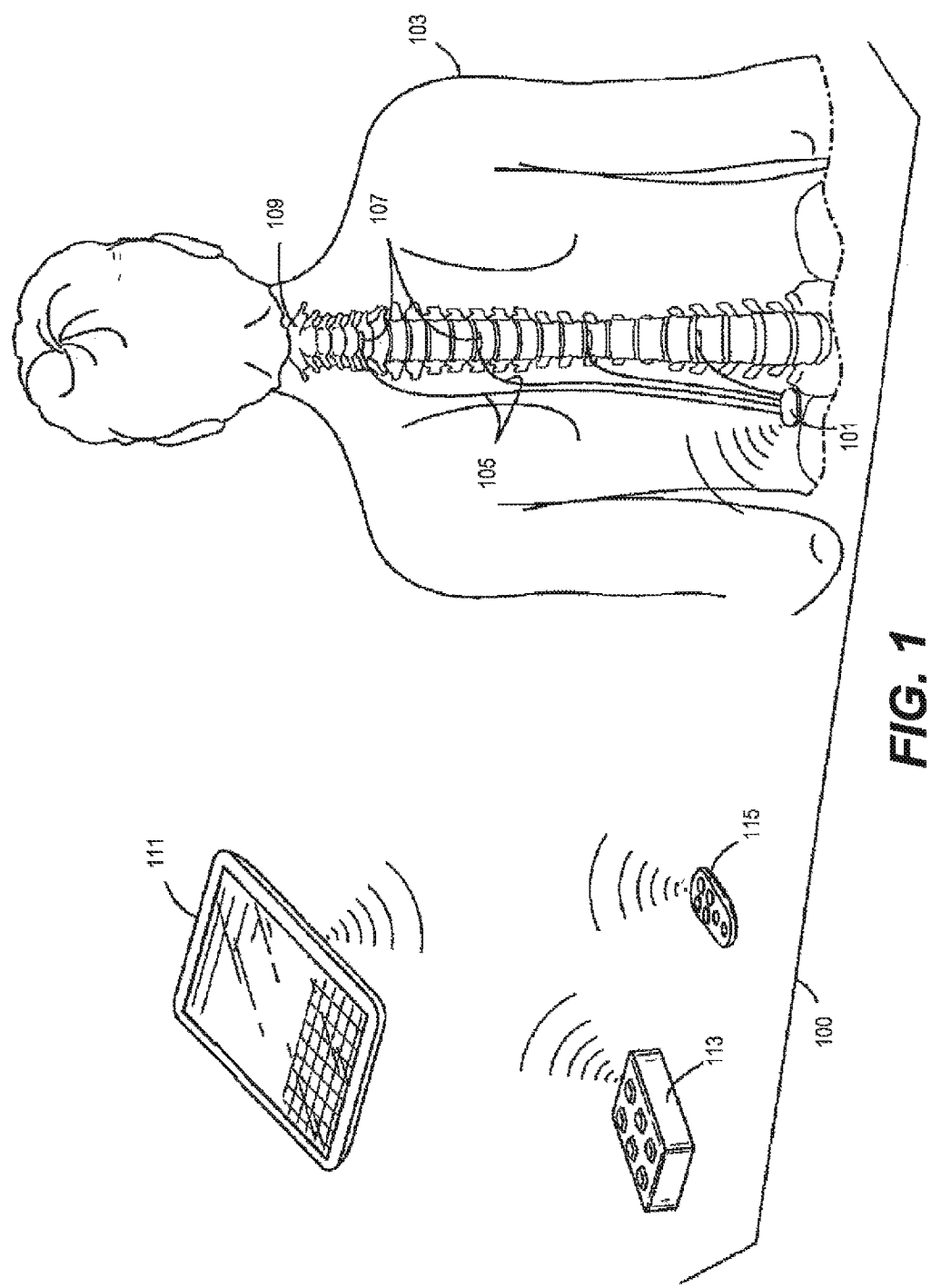
FIG. 1 is a partial perspective view of a patient using a spinal cord stimulation system according to one embodiment.

FIG. 1 illustrates a spinal cord stimulation system 100. The system includes an implanted pulse generator (IPG) 101 implanted inside a patient 103. The IPG 101 includes several implanted medical electric leads 105 that each includes electrode arrays 107 at the distal end of the based lead cable. The electrode arrays 107 each include multiple electrical stimulation electrodes placed adjacent to the dura of the spine 109 of the patient 103 using an anchor. The spinal column includes the C1-C7 (cervical), T1-T12 (thoracic), L1-L5 (lumbar), and S1-S6 (sacral) vertebrae and the electrode arrays 107 may be positioned anywhere along the spine 109 to deliver the intended therapeutic effects of spinal cord electrical stimulation in a desired region of the spine 109. The electrodes of the electrode arrays 135 promote electrical stimulation to the neurons of the spine based on electrical signals generated by the IPG 101. The stimulation is provided from the IPG 101 to the electrodes via the base lead, which is connected to the IPG 101 with the proximal end of the base lead. The body of the lead can traverse through the body of the patient 103 via the spinal column and from the spinal column through the body of the patient 103 to the implant site of the IPG 101.

The IPG 101 communicates with one or more external devices to send and receive operational commands, operating parameters, or other data. One type of external device is a clinical control device (or clinician programmer) 111. The clinical control device 111 is typically a device that is located at a clinical site such as a physician's office. The clinical control device 111 can be handheld or non-portable. Other types of external devices include a patient control device such as a portable programmer/charger 113 and a pocket (fob) programmer 115. These devices are portable and can be carried by the patient to provide commands and other data to the implanted device 101. Patient control devices typically have more limited functionality than the clinical control device 111.

Examples of implantable pulse generators and spinal cord stimulation systems are described in further detail in U.S. application Ser. No. 13/118,764, titled "SYSTEM AND METHOD OF ESTABLISHING A PROTOCOL FOR PROVIDING ELECTRICAL STIMULATION WITH A STIMULATION SYSTEM TO TREAT A PATIENT," filed on May 31, 2011, and U.S. application Ser. No. 13/118,775, also titled "SYSTEM AND METHOD OF ESTABLISHING A PROTOCOL FOR PROVIDING ELECTRICAL STIMULATION WITH A STIMULATION SYSTEM TO TREAT A PATIENT," filed on May 31, 2011, both of which are incorporated herein by reference in their entirety. Although the systems and methods describe herein as implemented in a spinal cord stimulation system, the device pairing and communication described below can also be implemented in other constructions in other types of implanted medical devices, including cardiac pacemakers and cochlear devices.

Figure 2:
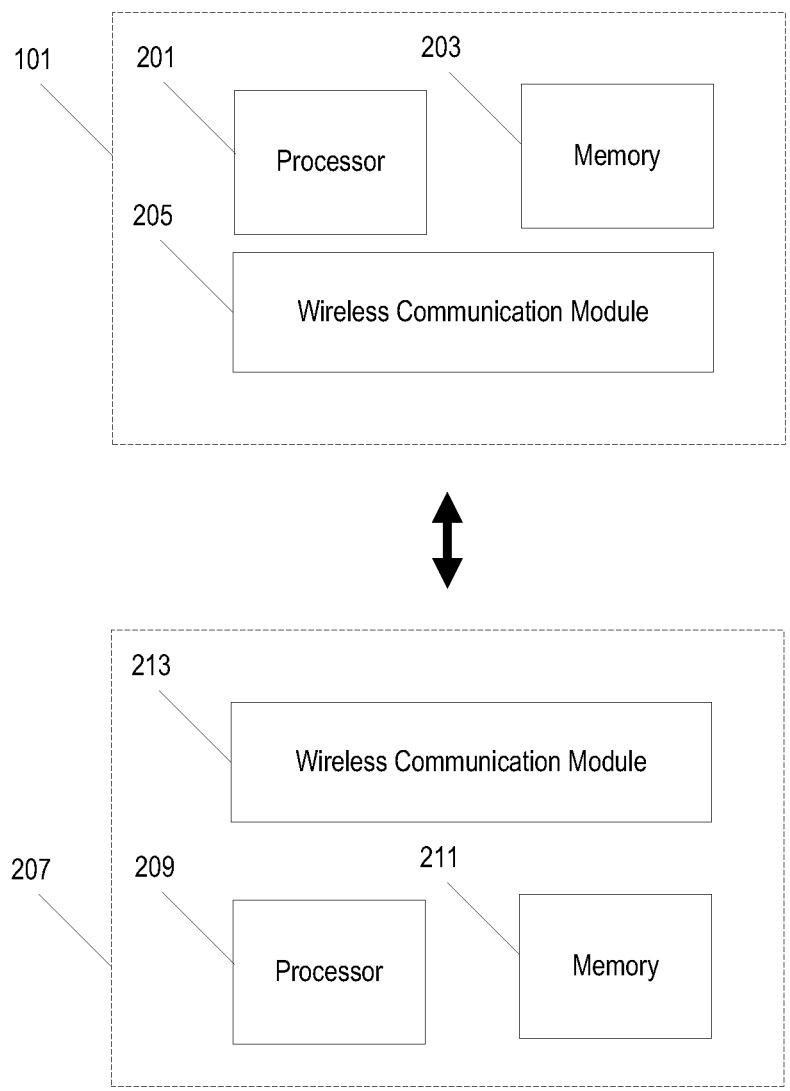
FIG. 2 is a block diagram of a system for communication between an implanted medical device and an external system in the spinal cord stimulation system of FIG. 1.

As illustrated in FIG. 2, the implanted medical device (the IPG) 101 includes a processor 201, a memory 203, and a wireless communication module 205. The memory 203 stores instructions that are executed by the processor 201 to control the operation of the implanted medical device 101. The wireless communication module 205 includes a radio frequency (RF) transmitter/receiver that uses the Medical Implant Communication Service (MICS) band to communicate with one or more external devices. However, in other constructions, the wireless communication module 205 can utilize other communication technologies such as Bluetooth. The external device 207 (e.g., the clinical control device 111, the portable programmer/charger 113, or the pocket (fob) programmer 115) also includes a processor 209, a memory 211, and a wireless communication module 213. Like the implanted medical device 101, the memory 211 of the external device 207 also stores instructions that are executed by the processor 209 to control the operation of the external device 207. The wireless communication module 213 includes a RF transmitter/receiver that uses the MICS band to communicate with one or more implanted medical devices. Examples of protocols used to communicate between an implanted medical device and an external device are described in further detail in U.S. application Ser. No. 13/334,361, titled "COMMUNICATION FOR IMPLANTABLE MEDICAL DEVICES," filed on Dec. 22, 2011, which is incorporated herein by reference in its entirety.

All messages sent and received between the implanted medical device 101 and the external device 207 includes at least one of an external device ID (EXID) and an implanted device ID (MIC ID) in the header of the message. The EXID identifies an external device that is sending the message and the MICS ID identifies an implanted device that is sending a message. The EXID and the MICS ID can also be included in the message to identify the intended recipient of the message. In certain environments, such as a hospital, clinical, or support group meeting, it is possible that several patients will be fitted with the same implanted medical device. To prevent an implanted medical device from processing messages and commands intended for a different device, each implanted medical device 101 stores a list of external devices 207 that are approved to communicate with the specific implanted medical device 101. This matching process is referred to herein as device pairing. If the implanted medical device 101 receives a message and does not recognize the EXID in the header of the message, the implanted medical device 101 will not process any commands or instructions in the message. In some constructions, the implanted medical device 101 may provide a response to the external device 207 that the EXID sent by the external device is not contained in its list of approved external devices the implanted medical device 101 is allowed to accept commands from.

Figure 3:
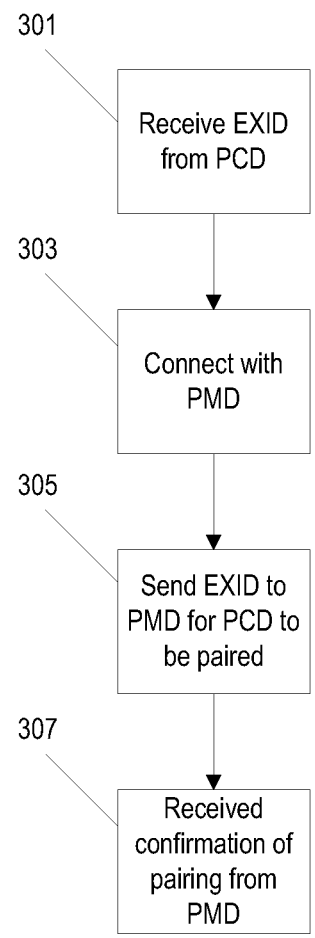
FIG. 3 is a flowchart of a method of sending messages to an implanted medical device from a clinical control device.

A clinical control device 111 can be used to update a stored list of approved external devices on an implanted medical device. FIG. 3 illustrates an example of how a clinical control device 111 communicates with an implanted medical device 101. In the example of FIG. 3, the clinical control device 111 is used to establish a pairing between a patient control device (e.g., the portable programmer/charger 113 or the pocket (fob) programmer 115) and an implanted medical device (PMD) 101 to allow the patient control device to communicate with the implanted medical device 101. The clinical control device (CCD) 111 receives an external device ID (EXID) from the patient control device (step 301). In various constructions, the CCD can receive the EXID from the patient control device through various means including, for example, electronic communication, a bar code scanner, or a manual input from a user. The CCD 111 then establishes a connection with a specific implanted medical device 101 that the patient control device is to be paired with (step 303). As described in more detail below, in some implementations, the implanted medical device 101 will always accept and process messages received from a clinical control device 111. The CCD 111 then sends the EXID to the implanted medical device 101 (step 305). The EXID sent to the implanted medical device 101 is associated with a specific patient control device and indicates that that specific patient control device is approved to communicate with the implanted medical device 101. The implanted medical device 101 stores the approved EXID to its internal memory 203 and sends a confirmation to the CCD 111 that the device pairing was successful. When the confirmation message is received by the CCD 111 (step 307), the pairing process of the CCD 111 is concluded. A similar process is used to remove EXIDs from the list of approved external device IDs.

Figure 4:
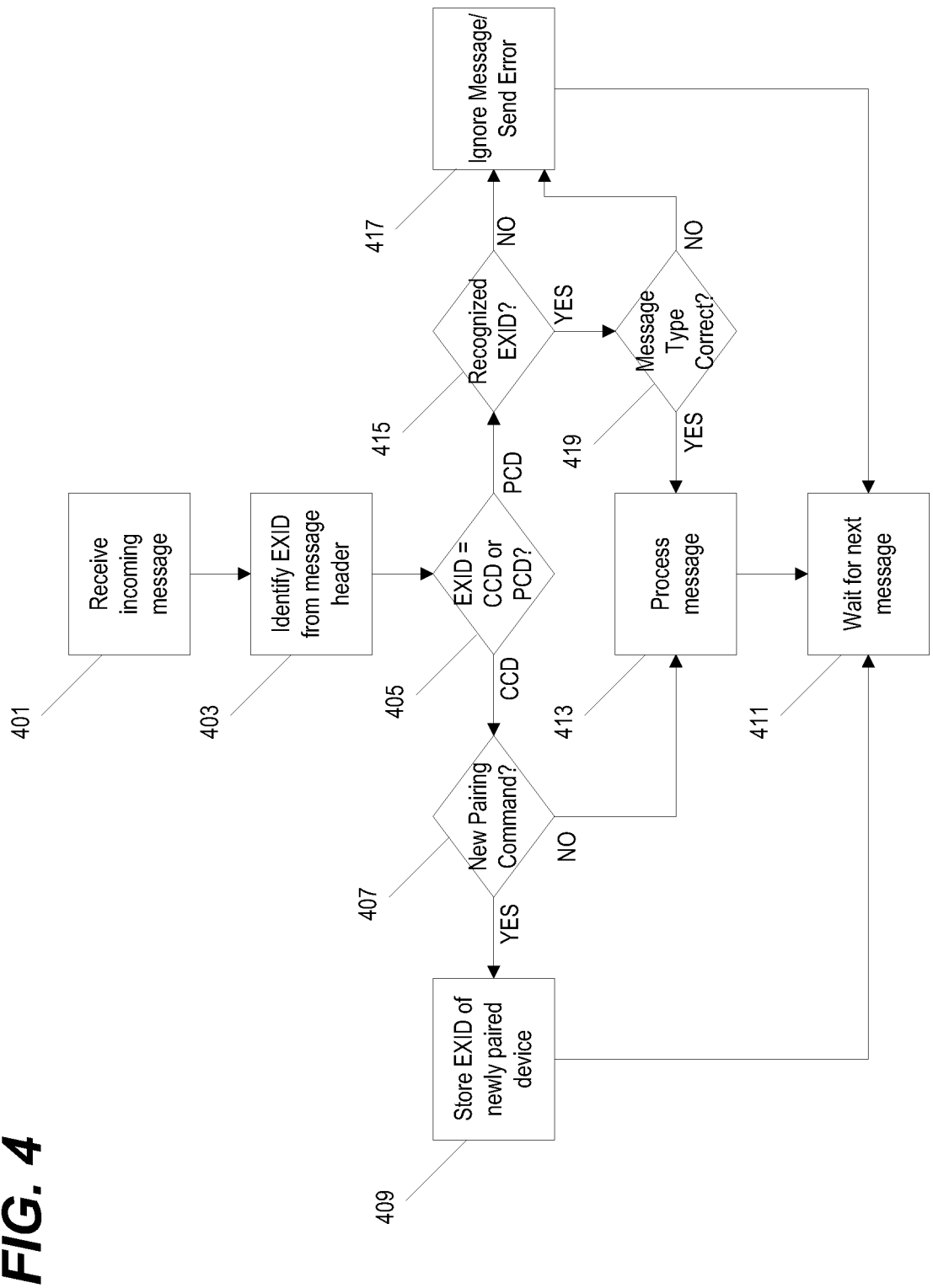
FIG. 4 is a flowchart of a method of processing messages received by an implanted medical device from an external device.

FIG. 4 illustrates a process by which an implanted medical device 101 receives and processes messages from external devices. The implanted medical device 101 receives an incoming message (step 401) and identifies an EXID from the message header (step 403). The EXID in the header of the message identifies the external device that sent the message. The implanted medical device 101 then determines whether the EXID is associated with a clinical control device (step 405). In this example, the EXID is a three byte value that uniquely identifies the external device. A range of values is reserved for clinical control devices so that an implanted medical device 101 is able to determine when the external device sending the message is a clinical control device even if the implanted medical device 101 has not previously communicated with the clinical control device. For example, if a range from 0xFF0000 to 0xFFFFFF is reserved for clinical control devices, an implanted medical device 101 will always accept and process messages from an external device with an EXID within this range. If, however, the implanted device receives a message from an external device with an EXID outside of this range (i.e., from 0x000000 to 0xFEFFFF), then the implanted medical device 101 will conclude that the device sending the message is not a clinical control device and will process the message differently.

If the implanted medical device 101 determines that the received message was sent from a clinical control device, the implanted medical device 101 analyzes the message to determine what type of command has been sent (step 407). If the message includes a new pairing command, the implanted medical device 101 recognizes that the clinical control device is attempting to pair the implanted medical device 101 with a new, non-CCD external device. The implanted medical device 101 identifies a new EXID from the body of the message. The new EXID identifies the new non-CCD external device that will be paired with the implanted medical device 101. The implanted medical device 101 then stores the new EXID to a list of approved external IDs in its memory 203 (step 409). The implanted medical device 101 then continues to wait for a next incoming message. Alternatively, if the message received from a CCD device is not a new pairing command (step 407), the implanted medical device 101 processes the message (step 413) and responds accordingly. The implanted medical device 101 then continues to wait for a next incoming message.

If, however, the implanted medical device 101 determines that the received message was not sent by a clinical control device (step 405), the implanted device must determine whether the source of the message is approved to communicate with the implanted medical device before the message is processed. The implanted medical device 101 identifies the EXID from the message header and compares the EXID to a list of approved external device IDs stored on its memory 203 (step 415). If the EXID does not match any of the external device IDs in the stored list of approved external device IDs, the implanted medical device ignores the message (step 417) and continues to wait for a next message (step 411). In some constructions, the implanted medical device will also send a response message to the external device that sent the original message. The response message will indicate that the EXID does not match the list of approved external device IDs and that the external device is not approved to communicate with the implanted medical device.

If the implanted medical device 101 determines that the EXID from the header of the received message does not belong to a CCD (step 405), but does match an external device ID from the stored list of approved external device IDs (step 415), the implanted medical device 101 then determines if the command or instruction included in the message is a type of message that should be sent by the identified external device (step 419). To accomplish this, the implanted medical device 101 stores additional information along with the list of approved external device IDs. The additional information identifies the type of device associated with a specific approved external device ID and one or more commands that can be accepted and processed by the external device corresponding to the specific approved external device ID. If the message type does not correspond to a type of message that the implanted medical device 101 expects to receive from the identified external device (step 419), the implanted medical device will disregard the message and may send an error response message to the external device (step 417). If, however, the EXID is recognized as an approved external device and the message is of a type that the implanted medical device 101 expects to receive from the approved external device, then the implanted medical device 101 processes the message (step 413) and continues to wait for further messages from external devices (step 411).

In some constructions, a clinical control device 111 is also used to establish a list of MICS IDs corresponding to one or more implanted medical devices that an external device is authorized to communicate with. This process is similar to the programming process illustrated in FIG. 3, described above. However, in other constructions, the external device itself is able to search for and identify implanted medical devices that it is approved to communicate with and is able to determine when a previous pairing has been removed and the external device is no longer approved to communicate with a specific implanted medical device.

Figure 5:
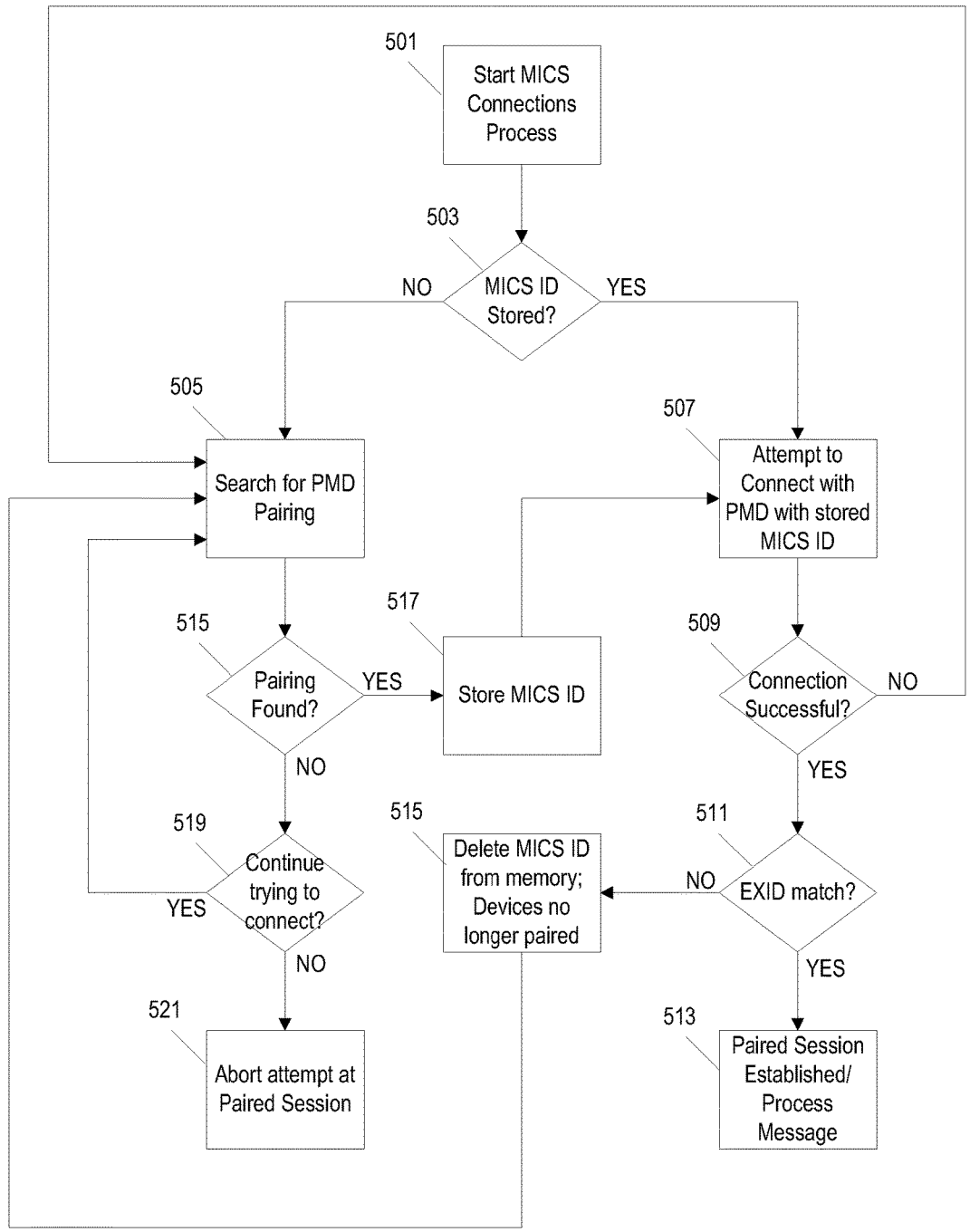
FIG. 5 is a flowchart of a method of a personal control device attempting to establish a paired communication session with an implanted medical device.

FIG. 5 illustrates a method by which an external device establishes and attempts to establish a paired communication session with an implanted medical device. When the external device is powered on or when a button is pressed on the external device and a message is generated, the external device attempts to establish a MICS communication session with a paired implanted medical device (step 501). The external device then checks to see if a MICS ID identifying a paired implanted medical device has been stored to the internal memory of the external device (step 503). If there is no stored MICS ID, then the external device is not currently paired with an implanted medical device. The external device then begins a process of searching for a paired implanted medical device (step 505) as described in further detail below.

However, if a MICS ID for a paired implanted medical device is stored in the memory of the external device, the external device determines that a previous pairing had been established and attempts to connect with the implanted medical device corresponding to the stored MICS ID (step 507). If the connection is not successful (step 509), the external device may begin searching for a new pairing implanted medical device (step 505). If a connection with the implanted medical device corresponding to the stored MICS ID is established, the implanted medical device checks to see if the external device ID (EXID) for the external device is included in the list of approved external device IDs stored to the memory of the implanted medical device (step 511) and returns a reply message to the external device confirming whether the EXID is included in the list of approved external device IDs. If the EXID for the external device matches an external device ID on the list of approved external device IDs for the implanted medical device, then the external device receives a message from the implanted medical device confirming that the EXIDs match and that a paired communication session has been established (step 513). However, if the EXID for the external device does not match any of the stored EXIDs in the list of approved external device IDs for the implanted device, then the external device receives a message indicating that the pairing is no longer approved. The external device responds by deleting the MICS ID for the implanted medical device from its memory (step 515) and begins searching for a new pairing (step 505).

As described above, if pairing has not yet been established for an external device or if the external device is unable to connect with a previously paired implanted device (e.g., because the implanted device is out of range or because the external device is no longer approved to communicate with the implanted device), then the external device will begin to search for a new implanted medical device approved for paired communication (step 505). The search process is described in further detail below in reference to FIG. 6. If the search process discovers an implanted medical device approved for paired communication with the external device (step 515), then the external device stores the MICS ID for the paired implanted medical device to the memory of the external device (step 517) and attempts to establish a paired communication session with the paired implanted medical device (step 507). If the search process does not discover a paired implanted medical device, the external device may repeat the search process and continue to try to establish a connection with a paired medical device (step 519) for a defined number of attempts or until a time-out timer has expired. When the timer or the defined number of attempts has been exhausted without successfully establishing a paired communication session, the external device aborts the attempt to establish communication (step 521).

As illustrated in FIG. 5, in some constructions, an external device can discover additional approved implanted medical devices for paired communication even after the device has been paired with a first implanted medical device. As such, a single external device can be paired with multiple implanted medical devices. However, in other constructions, an external device can only be paired with one implanted medical device. In such constructions, the external device will not search for new MICS IDs until a previously paired implanted medical device confirms that the external device is no longer approved to communicate with the implanted medical device and the external device responds by deleting the MICS ID for that implanted medical device from its memory.

Figure 6:
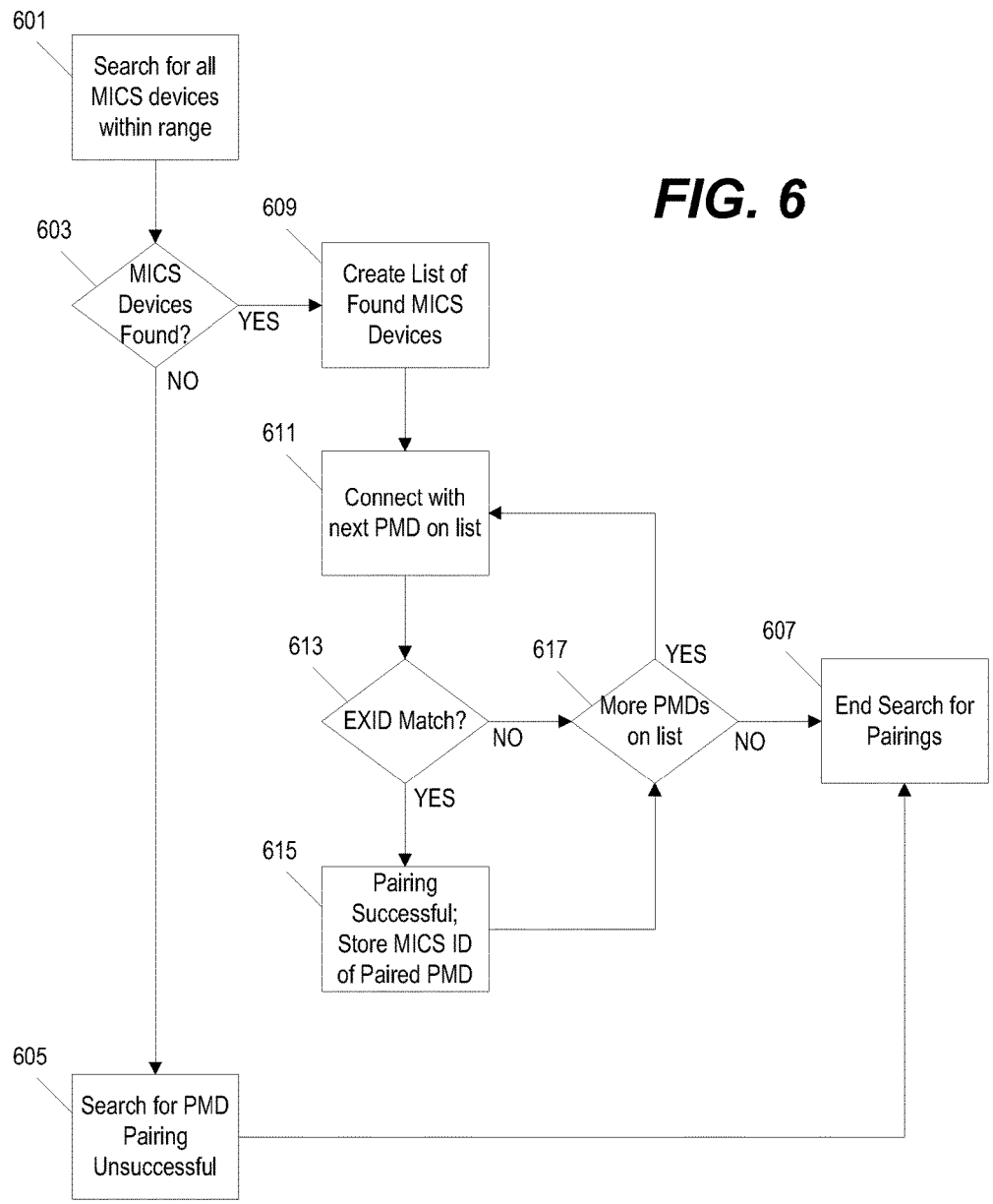
FIG. 6 is a flowchart of a method of a personal control device searching for paired implanted medical devices.

FIG. 6 illustrates in further detail the process by which an external device search for a device with which to establish a paired communication relationship. The external device begins by searching for all MICS devices within range of the external device (step 601). If no MICS devices are found (step 603), the external device concludes that the search for a paired implanted medical device was unsuccessful (step 605) and ends the search for pairings (step 607). As described above in reference to FIG. 5, if the search process is unsuccessful in identifying a paired implanted medical device, the external device may repeat the search process.

If the external device discovers one or more MICS devices within range of the wireless communication module (step 603), the external device creates a list of the discovered MICS devices (step 609) and attempts to connect with the first implanted medical device on the list (step 611). As described above, the implanted medical device will then determine whether the external device is approved to communication with the implanted medical device by comparing the EXID corresponding to the external device to a list of approved external device IDs stored in the memory of the implanted device (step 613). If the EXID matches one of the external device IDs from the list of approved external device IDs, the external device will receive a message confirming that the external device is approved to communicate with the implanted device (step 615). The external device then stores the MICS ID for the paired implanted medical device to its memory. If, however, the EXID does not match any of the external device IDs from the list of approved external device IDs, then the external device does not save the MICS ID for that implanted medical device.

The external device continues to repeat this process (steps 611, 613, and 615) for all of the MICS devices found within range of the external device (step 617). Once the external device has attempted to connect with all of the MICS devices, the external device ends its search for pairings (step 607). As described above, in some constructions, the external device is only paired with a single implanted medical device. Although the search process illustrated in FIG. 6 shows the external device attempting to connect with all MICS devices within range, in constructions where the external device is only paired with a single implanted medical device, the external device will terminate the search process as soon as a successful pairing is found (e.g., moving directly from step 615 to step 607).

Thus, the invention provides, among other things, systems and methods for communication between an implanted medical device and approved external devices. The invention also provides systems and methods for identifying and establishing paired relationships between implanted medical devices and external devices. Various features and advantages of the invention are set forth in the following claims.

What is claimed is:

1. A method of communicating between an implanted medical device implanted in a patient and an authorized external device external to the patient, comprising:
   receiving, by the implanted device, a first data packet of a new message from an external device;
   identifying an external device ID in the received data packet, the external device ID identifying an external device that sent the message, the external device ID containing a value;
   determining whether the value of the external device ID falls within a predetermined range, the predetermined range being set before the any communication is established between the external device and the implanted device;
   in response to the value of the external device ID being determined to fall within the predetermined range, performing the following steps:
      determining that the external device is a clinical control device with which communication is always approved; and
      processing the message from the external device; and
   in response to the value of the external device ID being determined to fall outside of the predetermined range, performing the following steps:
      determining that the external device is not the clinical control device;
      comparing the external device ID to a stored list of a plurality of approved external device IDs;

processing the message when the external device ID matches one of the approved external device IDs in the stored list of approved external device IDs; and
disregarding the message when the external device ID does not match any of the approved external device IDs in the stored list of approved external device IDs;

wherein:
the message sent from the first external device to the implanted medical device includes a header and a body;
the first device identifier is located in the header of the message; and
the second device identifier is located in the body of the message.

2. The method of claim 1, further comprising:
determining whether the external device ID is an external device ID corresponding to a clinical control device based on whether the value of the external device ID falls within the predetermined range;
processing all messages received from the clinical control device; and
processing messages received from external devices other than the clinical control device only when the external device ID matches one of the approved external device IDs in the stored list of approved external device IDs.

3. The method of claim 2, wherein the value of the external device ID includes a multiple-byte value, wherein the determining whether the external device ID is an external device ID corresponding to a clinical control device includes:
comparing the multiple-byte value of the external device ID to a range of external device ID values corresponding to clinical control devices; and
determining that the external device ID is an external device ID corresponding to a clinical control device when the multiple-byte value of the external device ID is within the range.

4. The method of claim 2, wherein when the external device ID is the external device ID corresponding to the clinical control device and the received message is a new pairing message, further comprising:
identifying a new approved external device ID in the new pairing message; and
storing the new approved external device ID to the stored list of approved external device IDs.

5. The method of claim 2, wherein when the external device ID is the external device ID corresponding to the clinical control device and the received message is a remove pairing message, further comprising:
identifying a disapproved external device ID in the remove pairing message; and
removing the disapproved external device ID from the stored list of approved external device IDs.

6. The method of claim 1, further comprising:
identifying a message type of the received message;
processing the message only when a device corresponding to the external device ID is authorized to send messages of the identified message type; and
disregarding the message when the device corresponding to the external device ID is not authorized to send messages of the identified message type.

7. An implantable medical device comprising:
a processor; and
a memory storing instructions that, when executed by the processor, cause the implantable medical device to:
receive a first data packet of a new message from an external device;
identify an external device ID in the received data packet, the external device ID identifying an external device that sent the message, the external device ID containing a value;
determine whether the value of the external device ID falls within a predetermined range, the predetermined range being set before the any communication is established between the external device and the implanted device;
in response to the value of the external device ID being determined to fall within the predetermined range, performing the following steps:
determining that the external device is a clinical control device with which communication is always approved; and
processing the message from the external device; and
in response to the value of the external device ID being determined to fall outside of the predetermined range, performing the following steps:
determining that the external device is not the clinical control device;
compare the external device ID to a stored list of a plurality of approved external device IDs;
process the message when the external device ID matches one of the approved external device IDs in the stored list of approved external device IDs; and
disregard the message when the external device ID does not match any of the approved external device IDs in the stored list of approved external device IDs;

wherein:
the message sent from the first external device to the implanted medical device includes a header and a body;
the first device identifier is located in the header of the message; and
the second device identifier is located in the body of the message.

8. The implantable medical device of claim 7, wherein the memory stores further instructions, which, when executed by the processor, further cause the implantable medical device to:
determine whether the external device ID is an external device ID corresponding to a clinical control device based on whether the value of the external device ID falls within the predetermined range;
process all messages received from clinical control devices; and
process message received from external devices other than clinical control devices only when the external device ID matches one of the approved external device IDs in the stored list of approved external device IDs.

9. The implantable medical device of claim 8, wherein the value of the external device ID includes a multiple-byte value, wherein the memory stores further instructions, which, when executed by the processor, further cause the implantable medical device to:
compare the multiple-byte value of the external device ID to a range of external device ID values corresponding to clinical control devices; and
determine that the external device ID is an external device ID corresponding to a clinical control device when the multiple-byte value of the external device ID is within the range.

10. A stimulation system comprising:
an external device including a first wireless communication module; and an implantable device including a stimulation module configured to provide electrical stimulation to a patient, the implantable device including a second wireless communication module configured to conduct telecommunications with the first wireless communication module, a memory storing instructions, and a processor configured to execute the instructions to:
receive a first data package of a new message from the first wireless communication module of the external device;
identify an external device ID in the received data packet, the external device ID identifying the external device that sent the message, the external device ID containing a value;
determine whether the value of the external device ID falls within a predetermined range the predetermined range being set before the any communication is established between the external device and the implanted device;
in response to the value of the external device ID being determined to fall within the predetermined range, performing the following steps:
determining that the external device is a clinical control device with which communication is always approved; and
processing the message from the external device; and
in response to the value of the external device ID being determined to fall outside of the predetermined range, performing the following steps:
determining that the external device is not the clinical control device;
compare the external device ID to a stored list of approved external device IDs;
process received messages that include an approved external device ID; and
disregard messages that do not include an approved external device ID;
wherein:
the message sent from the first external device to the implanted medical device includes a header and a body;
the first device identifier is located in the header of the message; and
the second device identifier is located in the body of the message.

11. The stimulation system of claim 10, wherein the first wireless communication module is configured to:
transmit a message including an external device ID of the external device, the message being intended for the implanted device;
receive a response message from the implantable device, the message indicating that the external device ID matches an external device ID from a list of approved external device IDs stored in a memory of the implanted medical device;
store an implanted device ID corresponding to the implantable device that sent the response message; and
send subsequent command messages to control the operation of the implantable device.

12. The stimulation system of claim 11, wherein the first wireless communication module is further configured to:
send a subsequent message to the implantable device, the subsequent message including the external device ID for the external device;
receive a subsequent response message from the implantable device, the subsequent response message indicating that the external device ID from the subsequent message does not match any external device ID from the stored list of approved external device IDs; and
indicate that the implantable device corresponding to the implanted device ID stored in the memory of the external device is no longer paired with the external device.

13. A method, comprising:
initiating, by a first external device external to a patient, communication with an implanted medical device within communication range of the first external device, the implanted medical device being implanted in the patient;
receiving, by a first external device, a second device identifier associated with a second external device that is external to the patient, the second external device being different from the first external device;
sending, from the first external device, a message to the implanted medical device, the message containing: a first device identifier associated with the first external device, the second device identifier, and a pairing command instructing the implanted medical device to pair with the second external device; and
receiving, by the first external device, a confirmation message from the implanted medical device that a pairing between the implanted medical device and the second external device has been successful;
wherein:
the message sent from the first external device to the implanted medical device includes a header and a body;
the first device identifier is located in the header of the message; and
the second device identifier is located in the body of the message.

14. The method of claim 13, further comprising:
processing, by the implanted medical device, the message sent from the first external device in response to a determination that a value of the first device identifier falls within a predetermined range; and
storing, by the implanted medical device, the second device identifier to a list of approved external devices.

15. The method of claim 13, wherein:
the first external device is a clinical control device; and
the second external device is a patient control device.

16. An clinical control device external to a patient for communicating with an implanted medical device implanted in the patient, the clinical control device comprising:
a processor; and
a memory storing instructions that, when executed by the processor, cause the external device to perform the following operations:
initiating, by the clinical control device, communication with the implanted medical device within communication range of the clinical control device, the implanted medical device being implanted in the patient;
receiving, by the clinical control device, a second device identifier associated with a patient control device that is external to the patient, wherein the patient control device is different from the clinical control device;
sending, from the clinical control device, a message to the implanted medical device, the message containing: a first device identifier associated with the clinical control device, the second device identifier, and a pairing command instructing the implanted medical device to pair with the patient control device; and receiving, by the clinical control device, a confirmation message from the implanted medical device that a pairing between the implanted medical device and the patient control device has been successful;

wherein:

the message sent from the first external device to the implanted medical device includes a header and a body;

the first device identifier is located in the header of the message; and the second device identifier is located in the body of the message.

17. The clinical control device of claim 16, wherein the operations further comprise:

processing, by the implanted medical device, the message sent from the clinical control device in response to a determination that a value of the first device identifier falls within a predetermined range; and storing, by the implanted medical device, the second device identifier to a list of approved external devices.

18. The clinical control device of claim 16, wherein the first device identifier contains a value that falls within a predetermined range of values that are recognizable by the implanted medical device.

19. The method of claim 1, wherein the external device ID comprises an alphanumeric format.

20. The implantable medical device of claim 7, wherein the external device ID comprises an alphanumeric format.

* * * * *